March 11, 1952     T. A. KESTELL     2,589,090
GEARING
Filed Nov. 15, 1945     5 Sheets-Sheet 1
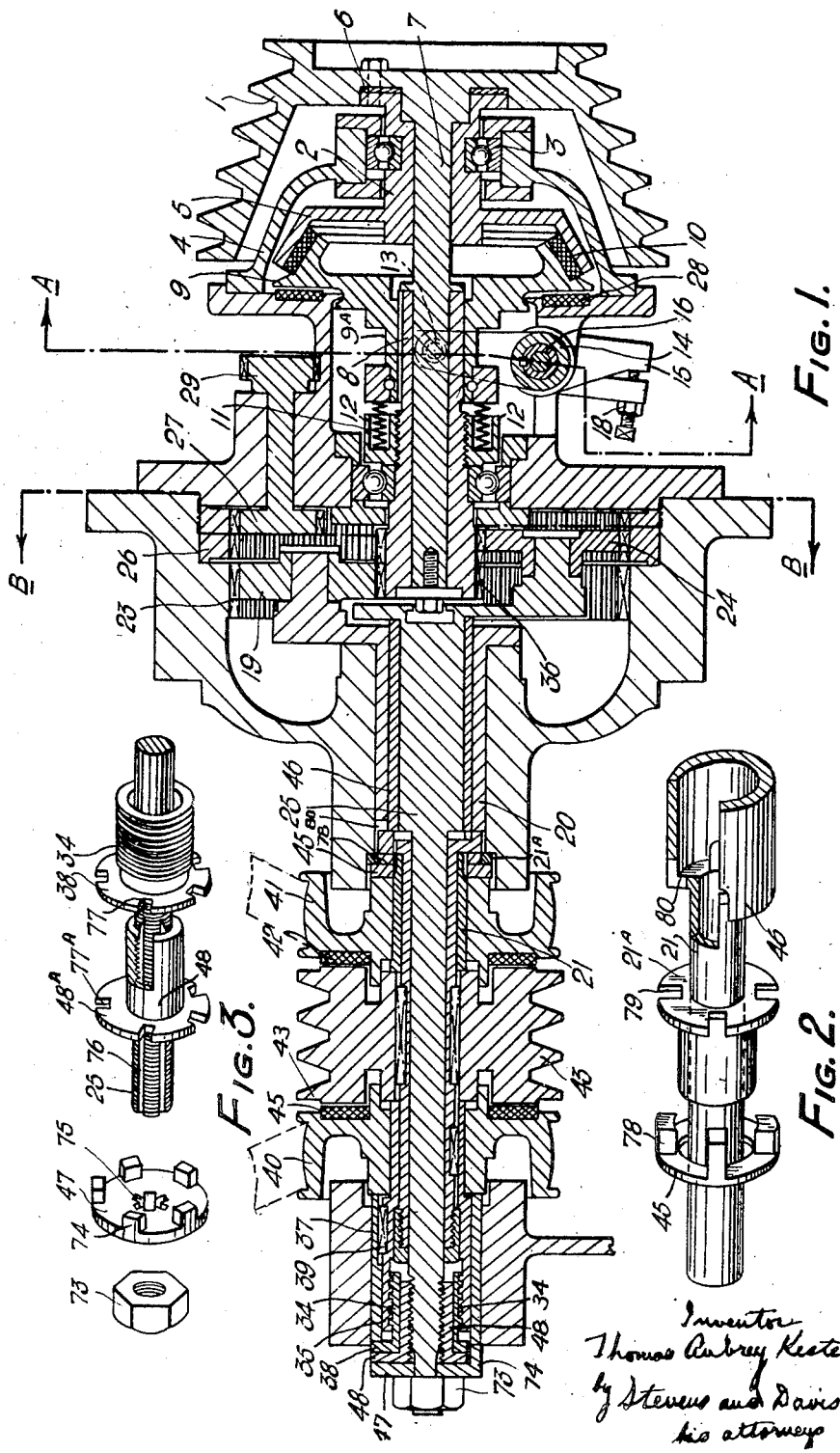
Inventor
Thomas Aubrey Kestell
by Stevens and Davis
his attorneys March 11, 1952     T. A. KESTELL     2,589,090
GEARING Filed Nov. 15, 1945     5 Sheets-Sheet 2

Inventor
Thomas Aubrey Kestell
by Stevens and Davis
his attorneys

March 11, 1952     T. A. KESTELL     2,589,090
GEARING
Filed Nov. 15, 1945           5 Sheets-Sheet 3
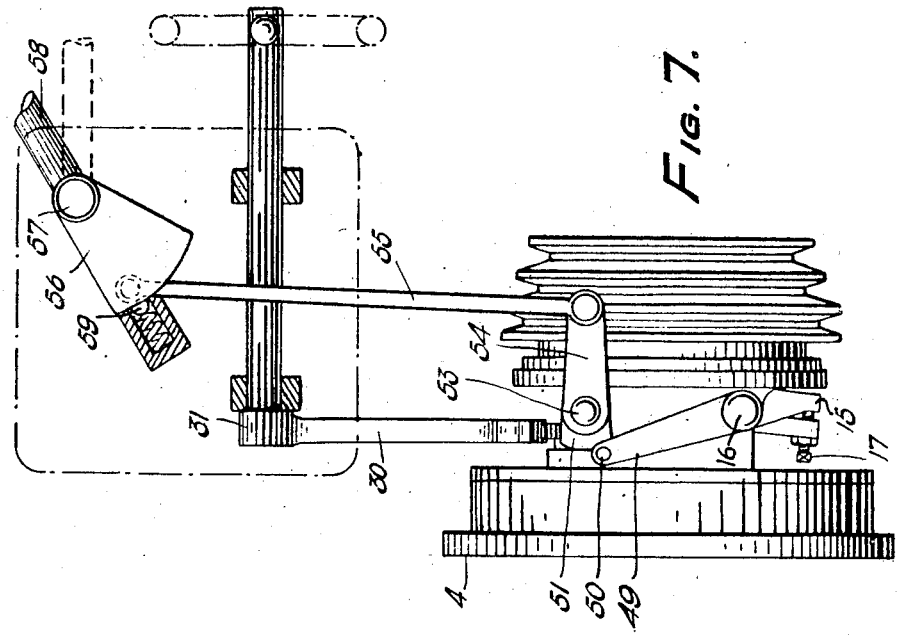
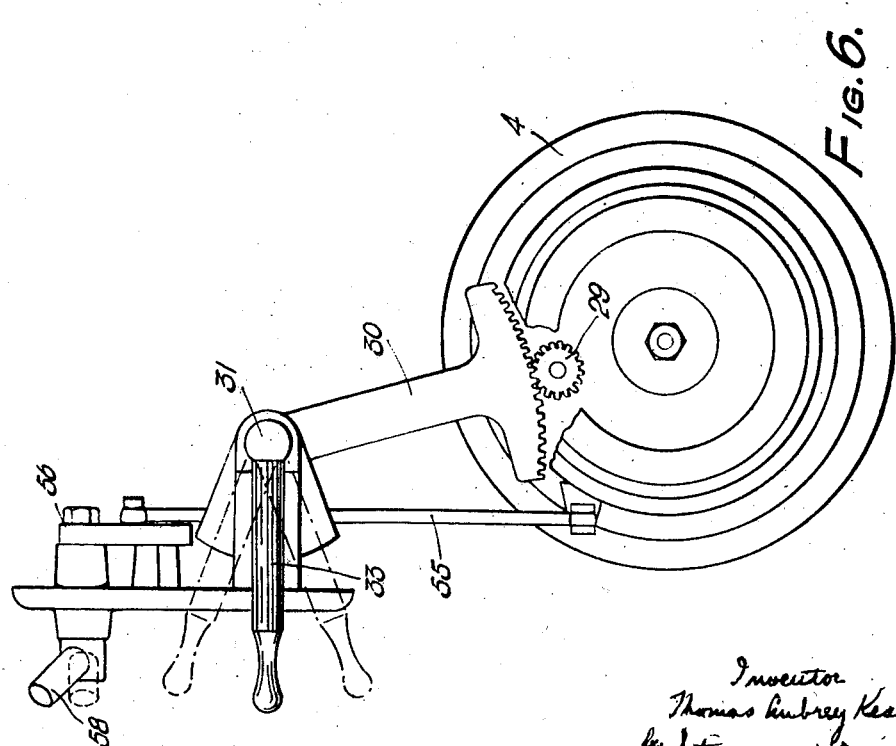

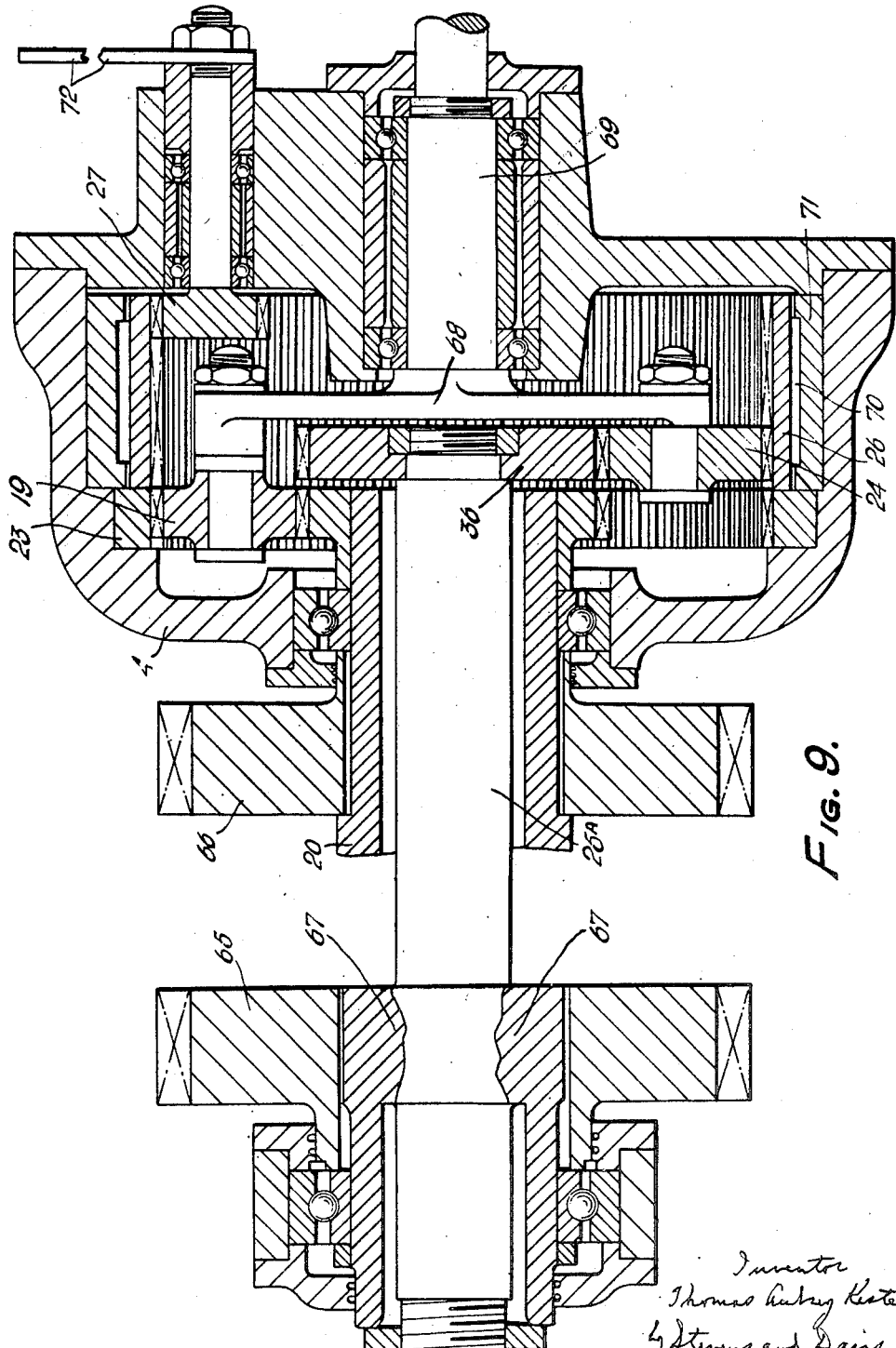

Patented Mar. 11, 1952

2,589,090

UNITED STATES PATENT OFFICE 2,589,090

GEARING

Thomas Aubrey Kestell, Thurmaston, England, assignor to Power Jets (Research & Development) Limited, London, England Application November 15, 1945, Serial No. 628,758
In Great Britain September 25, 1945

12 Claims. (Cl. 74—674)

The present invention relates to improvements in gearing for transmitting a drive to and imparting relative rotation between rotating shafts, and one object of the invention among others is to provide an apparatus for clutching or declutching a shaft to a main drive and to operate from said shaft, a secondary drive which may be used to effect a reversing movement without the production of any end thrust on the shaft bearings and thus reducing wear. Further objects of the invention are to provide a self-contained apparatus which will give a constant speed under slipping clutch conditions and enable a shaft to be stopped at any desired position. The invention may also be applied for various other operations, for example to vary the pitch of propeller blades.

The nature and further objects of the invention will appear from the following description which is given by way of example relative to three forms of embodiment of the invention illustrated in the accompanying drawings in which:

Fig. 1 is a vertical section of one form of embodiment as applied to a countershaft;

Figs. 2 and 3 are detail views of said embodiment;

Figs. 6 and 7 are diagrammatic views showing the action of the operating handles of said embodiment, Fig. 6 being an end view of Fig. 7;

Fig. 9 is a sectional view of a third form of embodiment.

Figure 4:
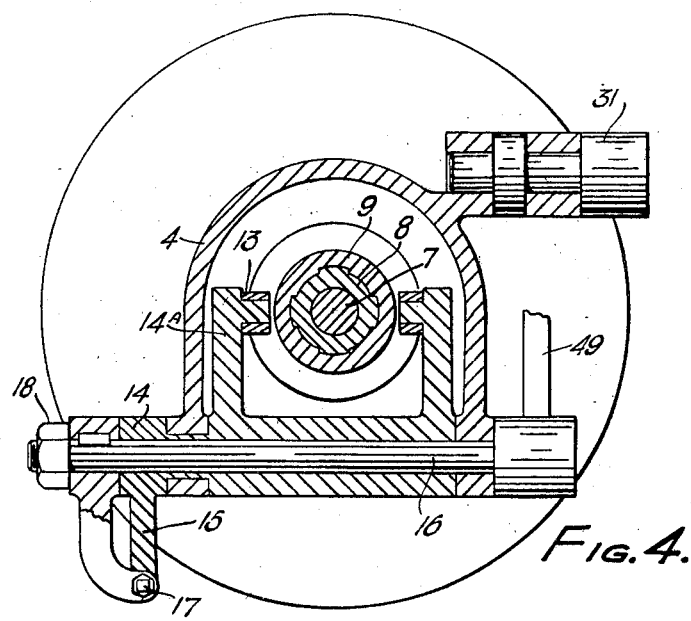
Fig. 4 is a section on the line A—A of Fig. 1.
Figure 5:
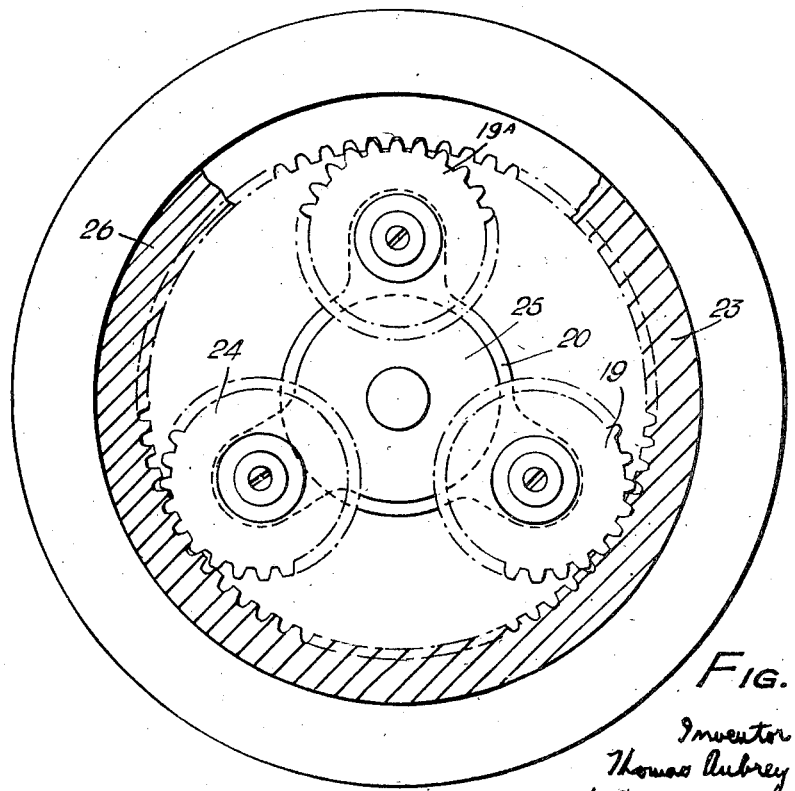
Fig. 5 is a section on the line B—B of Fig. 1.

Referring to Fig. 1, a pulley 1 is mounted on and is rigid with a flanged sleeve 2 which is itself journalled in ball bearings 3 in the main casing 4. A cone 5 is rigid with the said sleeve 2 which can be adjustably positioned relative to pulley 1 by means of interchangeable shim washers 6 of variable thickness. The pulley 1 is also rigid with shaft 7 which is journalled in and axially located with respect to sleeve 8 which in turn is journalled in ball bearings mounted in the main casing 4.

A cone 9 is splined to the sleeve 8 and is urged towards cone 5 by springs 11 carried in an internally threaded collar 12 which is screw threaded on the sleeve 8, said cone 9 being driven by cone 5 by means of a friction ring 10 rigid with cone 9.

The cone 9 may be withdrawn from the cone 5 by means of a pair of rollers 13 (see also Fig. 4) carried on the two arms 14A of a sleeve 14 having an arm 15 and mounted on a shaft 16; arm 15 may be set relative to said shaft 16 by a set screw 17 and rigidly clamped thereto by means of a nut 18.

A friction ring 28 is rigidly secured in casing 4 and is clear of cone 9 while the latter is engaged with ring 10. When cone 9 is disengaged from ring 10, the ring 28 acts as a brake for cone 9.

Sleeve 8 carries at one end a gear 36 adapted to act as the sun gear of a planetary train, the two gears 19 and 19A of which are carried by a hollow shaft 20 which is itself journalled in the main casing 4 and is located axially by means of a sleeve 21 rigid with pulley 43.

The planet gears 19 and 19A also engage with internal teeth in a stationary annular gear 23 rigid with the main casing 4.

A planet gear 24 of equal diameter to gears 19 and 19A is carried by a flanged shaft 25 and engages with the sun gear 36 and also with a second annular gear 26 which is normally stationary, but can be rotated through a small angle by a pinion 27. So long as cones 9 and 5 are in driving engagement, shaft 20 is driven through gears 36, 19, 19A and 23 while shaft 25 is driven through gears 36, 24, and 26, both trains constituting a transmission drive of any desired gear ratio.

Pinion 27 is rigid with pinion 29 which can engage with a gear segment 30 (Figs. 6 and 7) mounted on a shaft 31.

Also attached to the shaft 31 is an operating handle 33.

An externally threaded bush 34 is rigid with the shaft 25 and engages with an internally threaded sleeve 35 keyed to the shaft 20. Another sleeve 37 journalled in the main casing 4 abuts at one end against a flange 38 of bush 34 and is free to slide on the sleeve 35 but is prevented from relative rotational movement by a key 39. The sleeve 37 also engages the member 40 of a pair of pulleys 40, 41 each of which carries a friction disc 42 adapted to engage when desired with pulley 43.

The pulley 40 is journalled on sleeve 35 while the pulley 41 is journalled on sleeve 21.

A tongued washer 45 is provided with four tongues 78 (Fig. 2) adapted to be in slidable engagement with corresponding slots 79 in the flange 21A of sleeve 21 (Fig. 4) and with four apertures 80 in shaft 20, the tongued ends engaging with a sleeve 46 rigid axially with the shaft 25. Washer 45 is adapted to bear against pulley 41.

Rotation of gear 26 will produce a corresponding rotation of gear 24 and thence of shaft 25 relative to the shaft 20 and due to consequent rotation of bush 34 relative to sleeve 35, the latter together with shaft 25 will be axially displaced and will thus cause one of the pulleys 40, 41, to engage pulley 43.

At the same time, the other member of the pair of pulleys 40, 41, will be disengaged from pulley 43 and in an intermediate position of shaft 25 both pulleys 40, 41, will disengage from pulley 43. In the partly engaged position, a slipping drive will be obtained which is not disturbed by any frictional reaction due to the movement of, for example, sleeve 37, due to the fact that the movement of tongued washer 45 is restricted to sliding only relative to shaft 21 and sleeve 21A.

The relative setting of the two pulleys 40, 41, axially is performed by the removal of a tongued washer 47 and adjusting the relative setting of the members 48, 34, and the shaft 25.

The washer 47 is fixed as regards its relative angular position to shaft 25 by means of six splines 75 on said washer and six spline slots 76 on said shaft 25 (Fig. 3), and is also fixed relative to the bushes 48 and 34 by means of five slots 77 on flange 38 of bush 34 and five slots 77A on the flange 48A of bush 48, these slots engaging in five tongues 74 on washer 47 so that a differential adjustment can be obtained between shaft 25, bush 48, and sleeve 35. The whole assembly is locked by a nut 73.

A lever 49 (Fig. 7) is rigid with shaft 15 and carries at its upper end a roller 50 which is held into engagement with a cam segment 51 rigid with a shaft 53 carried by lever 54 attached to one end of a link 55. The other end of said link 55 is attached to a segment 56 rigid with a shaft 57 which carries another operating handle 58 (see also Fig. 6).

The segment 56 is held in its two extreme positions by a spring loaded ball 59.

In order to operate the pulley 43, the operator moves the handle 58 from the position shown in chain lines to the position shown in full lines in Fig. 7. This movement rocks the cam segment 51 in a clockwise direction as seen in the drawings, thus causing the lever 49 to rotate anti-clockwise and rocking shaft 16, sleeve 14 and arms 14A thus disengaging the rollers 13 from the left hand shoulder of the groove 9A in the cone 9 and permitting the said cone to be urged by the springs 11 into engagement with the driving cone 5.

The handle 33 is operated to clutch one or other of the pair of pulleys 40, 41 to the pulley 43. If the handle 33 is in the neutral position as shown in full lines in Fig. 6, the lifting of said handle to the upper position shown in chain lines in Fig. 6 rotates shaft 31, segment 30 and pinion 29 in an anti-clockwise direction, thus rocking annular gear 26 also anti-clockwise and rotating pinion 24 and shaft 25 in the same direction relative to the shaft 20. This causes bush 34 to rotate within the sleeve 35, and bush 34 and shaft 25 both move to the right, thus clutching pulley 40 and declutching pulley 41 from pulley 43. Movement of handle 33 downwards to the lower position shown in chain lines in Fig. 6 reverses the above described operations, disengaging pulley 40 and engaging pulley 41.

In order to use the apparatus to effect a reversing movement, pulley 40 is connected by an open belt and pulley 41 by a cross belt to an outside pulley (not shown) whose movement it is required to reverse, these belts being arranged at a small angle to one another as shown in dotted lines so as to tend to pull the pulleys 40, 41 apart, and disengage them from the main pulley 43. Then when pulley 40 is engaged with pulley 43, the outside pulley will rotate in one direction and when the pulley 41 is engaged with pulley 43 the outside pulley will rotate in the opposite direction.

As there is no frictional engagement tending to interfere with the setting of the internal gears, a partial movement of handle 33 can be made when desired, thus causing only a partial engagement of the pulleys 40 or 41 with 43 and a constant speed which is less than the normal full clutching speed can be obtained under slipping clutch conditions.

The form of embodiment above described affords a self-contained and reliable means for producing a clutching or reversible operation without producing end thrust on the bearings, thus reducing the wear and prolonging the life of the apparatus. It also enables a constant speed to be obtained under slipping clutch conditions, and further permits a shaft to be stopped in any desired position, or to be given any small movement desired.

Figure 8:
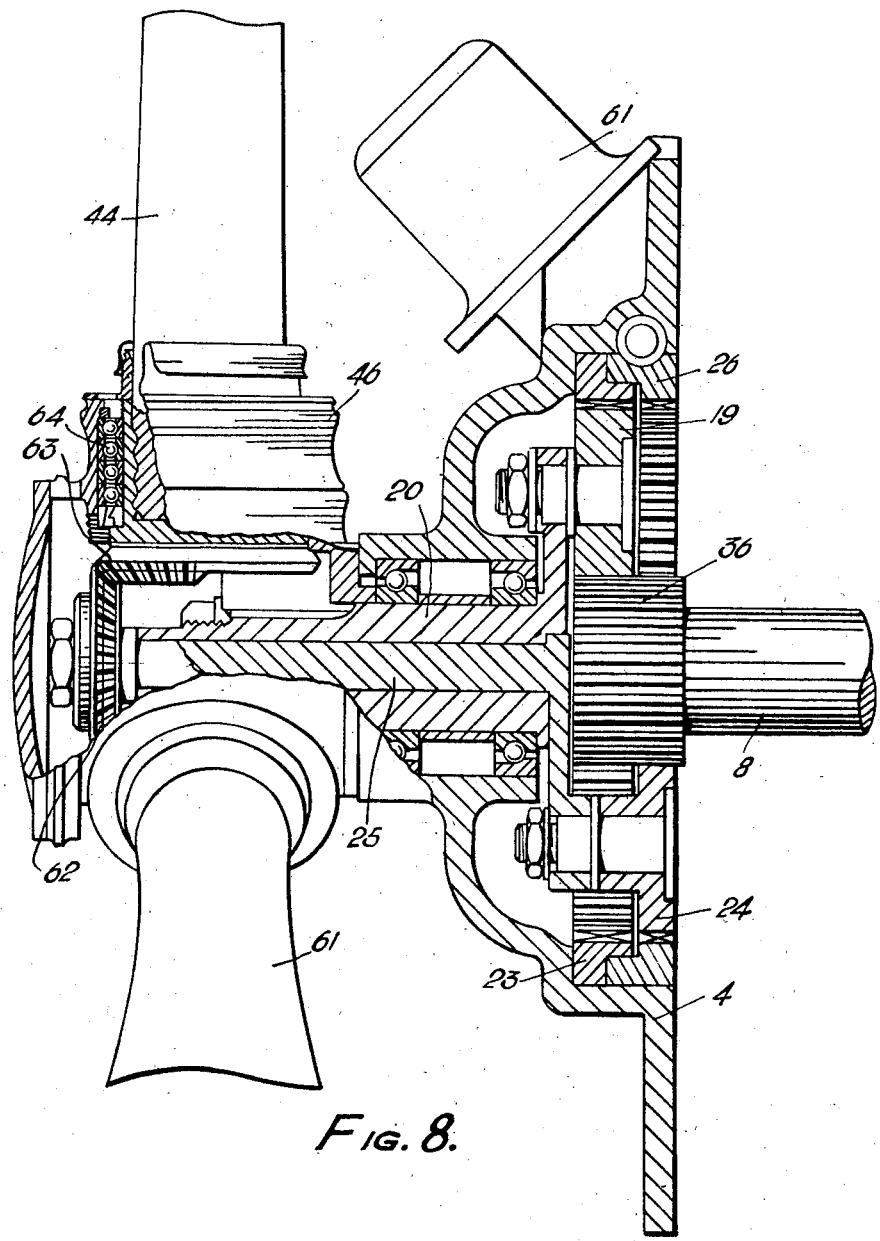
Fig. 8 is a sectional view of a second form of embodiment as applied to a variable pitch propeller.

Fig. 8 shows a second form of embodiment of the invention as applied to a variable pitch propeller, like reference numerals referring to like parts. As in the first form of embodiment above described, the apparatus essentially comprises a stationary annular gear 23 fixed to a casing 4 and a movable annular gear 26 rotatable by means of an electric motor 61. A planet gear 19 engages with internal teeth in gear 23 and is carried by the hollow flanged shaft 20 through which is driven the spider 46 carrying propeller blades 44, while planet gear 24 engages with internal teeth in gear 26 and is carried by shaft 25. Shaft 8 is the engine shaft and is rigid with sun gear 36 which engages the planet gears 19, 24 which in turn engage the annular gears 23 and 26. On the left hand end of shaft 25 is mounted a bevel gear 62 engaging with a bevel segment 63 rigid with the propeller blades 44 which rotate on bearings 64.

During normal flying with constant propeller pitch both shafts 20 and 25 rotate together. When it is desired to vary the pitch of the propeller blades 44 the motor 61 is momentarily switched on, thus rotating gear 26 and consequently shaft 25 a slight amount relative to shaft 20. This causes a rotation of bevel gear 62 thus rotating bevel segment 63 which in turn imparts its movement to the propeller blade 44 and turns the latter through the angle necessary to change its pitch to the new value required.

Fig. 9 shows a third form of embodiment having one driving shaft 69 and two output shafts 20, 25A carrying gears 66, 65, respectively. Sun gear 36 is rigid with shaft 25A and engages with planet gear 24 and annular gear 26, gears 19 and 24 are connected together by a member 68 rigid with shaft 69. The rotatable annular gear 26 is mounted on needle bearings 70 in a housing 71. As in Fig. 1, pinion 27 engages with and serves to rotate gear 26 which causes relative rotation between shafts 20 and 25A.

I claim:

1. Gearing for driving two concentric shafts from a third shaft and for imparting a relative rotation between the said concentric shafts, comprising two gear trains of the planetary type, one of said trains including a sun gear driven by said third shaft, a planet gear carried by each of said concentric shafts and engaging with said sun gear, and a stationary internally toothed annular gear co-axial with said sun gear and engaged by each of said planet gears, and the other of said trains including said sun gear, said planet gears, and a second internally toothed annular gear rotatable relative to said stationary annular gear and arranged co-axial with said sun gear and engageable by said planet gears.

2. Gearing according to claim 1 wherein the two annular gears are of equal internal diameter and the two planet gears are of equal external diameter.

3. Gearing according to claim 1 comprising sleeves on said concentric shafts, pulleys mounted on said sleeves, screw threaded means adapted to convert relative rotation between said concentric shafts into relative axial movement between said sleeves and means adapted to be actuated by said axial movement to couple selectively one of said two pulleys to a third pulley carried on one of said concentric shafts.

4. Gearing according to claim 3 wherein the said third pulley is carried by the outer of said concentric shafts.

5. In a variable pitch propeller mechanism comprising a plurality of blades, a shaft for carrying said propeller, a second shaft concentric with said propeller shaft and operative to vary the pitch of said blades and a third shaft; the provision of gearing for driving said concentric shafts from the said third shaft and for imparting relative rotation between the two concentric shafts, said gearing comprising two gear trains of the planetary type, one of said trains including a sun gear driven by said third shaft, a planet gear carried by each of said concentric shafts and engaging with said sun gear, and a stationary internally toothed annular gear co-axial with said sun gear and engaged by each of said planet gears; and the other of said trains including said sun gear, said planet gears, and a second internally toothed annular gear rotatable relative to said stationary annular gear and arranged co-axial with said sun gear and engageable by said planet gears.

6. Gearing according to claim 1 comprising at least two shafts co-axially and concentrically disposed means for positively driving one of said shafts to rotate a propeller blade spider, means for rotating said movable annular gear to impart a relative angular movement to another of said shafts, and means for coupling the latter shaft to a propeller blade held in said spider to convert said angular movement of said shaft into an angular movement of said blade relative to its plane of rotation.

7. Gearing according to claim 1 comprising at least two shafts co-axially and concentrically disposed, the outermost of said shafts being adapted to rotate a propeller blade spider, means for rotating said movable annular gear to impart an angular movement to the inner of said shafts, and means for coupling the said inner shaft to a propeller blade held in said spider to convert said angular movement of said shaft into an angular movement of said blade relative to its plane of rotation.

8. Gearing for driving at least two concentric shafts from a driver shaft and for imparting a relative rotation between at least two of said shafts comprising two planetary gear trains the elements of each of which includes a sun gear, at least one planet gear, a carrier for said planet gear, and an annular gear, one of said gear elements being common to both gear trains and being carried by said driver shaft, another of said elements of one gear train being carried by one of said concentric shafts and the corresponding gear element of the other gear train being carried by the other of said concentric shafts.

9. Gearing as claimed in claim 8 and wherein the common element of the gear train which is carried by the driver shaft is constituted by the planet gear carrier.

10. Gearing as claimed in claim 8 and wherein means independent of said driver and said concentric shafts are provided for relatively displacing the annular gears of said gear trains.

11. Gearing as claimed in claim 10 and wherein one of said annular gears is fixed.

12. Gearing for driving at least two shafts from a driver shaft and for imparting a relative rotation between at least two of said shafts comprising a first gear train of the planetary type including a sun gear on at least one shaft, at least one planet gear on another shaft, and a first annular gear concentric with said sun gear; and a second gear train of the planetary type including a sun gear, a second planet gear, a second annular gear concentric with said sun gear and rotatable relatively to said first annular gear; and at least one carrier for the planet gears of said trains, one of said gears of said gear trains being common to both gear trains and being associated with said driver shaft.

THOMAS AUBREY KESTELL.

REFERENCES CITED

The following references are of record in the file of this patent:

UNITED STATES PATENTS

| Number | Name | Date |
|--------|------|------|
| 1,441,803 | Hay | Jan. 9, 1923 |
| 1,699,359 | Hay | Jan. 15, 1929 |
| 1,963,664 | Lambert | June 19, 1934 |
| 1,969,280 | Smith | Aug. 7, 1934 |
| 2,007,417 | Aivaz | July 9, 1935 |
| 2,186,064 | Dekker | Jan. 9, 1940 |
| 2,228,638 | Mercier | Jan. 14, 1941 |
| 2,306,135 | Mercier | Dec. 22, 1942 |
| 2,370,675 | McCoy | Mar. 6, 1945 |
| 2,403,899 | Ammen | July 16, 1946 |
| 2,437,189 | Forsyth | Mar. 2, 1948 |

FOREIGN PATENTS

| Number | Country | Date |
|--------|---------|------|
| 357,807 | Italy | Mar. 28, 1938 |